(12) United States Patent
Boyer

(10) Patent No.: US 8,556,632 B2
(45) Date of Patent: Oct. 15, 2013

(54) ROSARY PRAYER STAND

(76) Inventor: Carol Valeria Boyer, West Friendship, MD (US)

( * ) Notice: Subject to any disclaimer, the term of this patent is extended or adjusted under 35 U.S.C. 154(b) by 238 days.

(21) Appl. No.: 13/210,286

(22) Filed: Aug. 15, 2011

(65) Prior Publication Data

US 2011/0300524 A1   Dec. 8, 2011

Related U.S. Application Data

(63) Continuation-in-part of application No. 29/355,080, filed on Feb. 2, 2010, now Pat. No. Des. 680,294.

(51) Int. Cl.
*A44C 23/00* (2006.01)

(52) U.S. Cl.
USPC .......................................................... 434/246

(58) Field of Classification Search
USPC ........... 434/188, 203, 204, 245, 246; D19/64; D99/26
See application file for complete search history.

(56) References Cited

U.S. PATENT DOCUMENTS

| | | | |
|---|---|---|---|
| 232,482 A | 9/1880 | Fitch | |
| 345,445 A * | 7/1886 | Pelletier | 434/203 |
| 378,866 A * | 3/1888 | Clark | 434/203 |
| 465,811 A | 12/1891 | Anderson | |
| 604,963 A | 5/1898 | Breinl | |
| 826,732 A | 7/1906 | Monachimoff | |
| 1,099,009 A | 6/1914 | Bennett | |
| D55,382 S | 6/1920 | Hovekamp | |
| D64,259 S | 3/1924 | McDermott | |
| D134,793 S | 1/1943 | Brennan | |
| D153,377 S | 4/1949 | Murray | |
| 2,471,762 A * | 5/1949 | Merrett | 446/227 |
| 2,653,395 A | 9/1953 | Cummings et al. | |
| 2,655,737 A | 10/1953 | Dero | |
| 2,714,269 A | 8/1955 | Charles | |
| D179,321 S * | 11/1956 | Sacksteder | D99/26 |
| 2,827,161 A | 3/1958 | Rosa | |
| D184,454 S | 2/1959 | Oppido | |
| D194,975 S | 4/1963 | Bren | |
| 3,151,404 A | 10/1964 | Schott | |
| 3,319,599 A | 5/1967 | Kussman | |
| D211,539 S | 6/1968 | Lademann | |
| D217,095 S | 4/1970 | Taylor | |
| D227,585 S | 7/1973 | Welbourn | |
| 3,811,205 A * | 5/1974 | Pitzler | 434/203 |

(Continued)

FOREIGN PATENT DOCUMENTS

| | | |
|---|---|---|
| JP | 2004089550 A | 3/2004 |
| JP | 2005211636 A | 8/2005 |

OTHER PUBLICATIONS

Wooden Abacus, Item #8WWABACUSUS2, http:IIwww.shopping.comIn-a-wooden-abacuslinfo, by Discount School Supply, 2011.*

(Continued)

*Primary Examiner* — Kurt Fernstrom
(74) *Attorney, Agent, or Firm* — Capital City TechLaw

(57) ABSTRACT

A rosary prayer stand may include frame, a plurality of parallel rods mounted on the frame, and a plurality of beads for counting prayers. Each bead's position on the stand and/or color may correspond to a particular rosary prayer. When each prayer is recited, the bead corresponding to that prayer is slid across the rod. The plurality of rods may have axes that intersect a transverse reference plane at locations along an arched path.

8 Claims, 4 Drawing Sheets

(56) References Cited

U.S. PATENT DOCUMENTS

| | | |
|---|---|---|
| D266,369 S | 9/1982 | Corigliano |
| D321,906 S * | 11/1991 | Neeley .......................... D19/64 |
| D324,698 S | 3/1992 | Bruns |
| 5,190,459 A * | 3/1993 | Determan ..................... 434/238 |
| D409,112 S | 5/1999 | Tosti et al. |
| D423,180 S | 4/2000 | Matthews-Saunders |
| 6,171,111 B1 * | 1/2001 | Buckner ....................... 434/203 |
| D459,567 S | 6/2002 | Salamon |
| D507,689 S | 7/2005 | Schmitt |
| D513,762 S | 1/2006 | Young |
| D529,551 S | 10/2006 | Rule |
| D534,960 S | 1/2007 | Rule |
| D558,271 S | 12/2007 | Rule |
| D587,756 S | 3/2009 | Rule |

OTHER PUBLICATIONS

Wooden Abacus, Item #8WWABACUSUS2, http://www.shopping.com/n-a-wooden-abacus/info, by Discount School Supply, 2011.

* cited by examiner

ROSARY PRAYER STAND

CROSS REFERENCE TO RELATED APPLICATION

This US non-provisional application is a continuation-in-part of prior application No. 29/355,080, filed Feb. 2, 2010 now U.S. Pat. No. D680,294, the content of which is incorporated herein in its entirety by reference.

BACKGROUND

1. Field

Example embodiments relate in general to an apparatus for counting and keeping track of prayers, and more specifically to a stand for counting and keeping track of rosary prayers.

2. Description of Related Art

One of the earliest forms of Christian prayer is the rosary, otherwise known as "crown of roses." The rosary is a series of repetitious prayers. Due to the complexity and number of prayers involved, worshipers have conventionally counted the prayers on a strand of rosary beads.

A strand of rosary beads, with its beauty, simplicity and history, has been a respected mechanism for meditation and counting prayers for centuries. However, some worshipers find using the traditional rosary beads problematic and fraught with shortcomings. For example, a strand of rosary beads may be difficult to hold and manipulate, especially if the worshiper is aged, sick, handicapped, arthritic, or suffering from swelling, numbness, or stiffness in their hands and fingers. Young worshipers having limited small motor coordination may also find it difficult to hold and manipulate a strand of rosary beads.

For some worshipers, physical limitations are not an issue, but instead mental challenges exist, such as attention deficit disorder or early phases of dementia or Alzheimer's. These worshipers may find counting prayers on a strand of rosary beads too difficult or confusing.

For the majority of worshipers, simple distractions or interruptions are a common occurrence. They either forget where they left off in the prayer sequence because they laid the strand of rosary beads down, or they "dropped" a bead in their hands, thereby, losing their prayer place on the strand of rosary beads; or they find themselves daydreaming before the recitation of the rosary is concluded forgetting on what bead they last prayed.

Many worshipers use the strand of rosary beads in conjunction with other prayer aids such as CD's or DVD's; whereby, the worshiper hears another's voice leading the prayer and the listener follows along. However, when the CD or DVD is paused and later restarted, the worshipper is hard pressed to know exactly where to begin in prayer. For instance, if the meditation picks up with a Hail Mary, it is difficult to know which Hail Mary in the sequence of prayers is being prayed.

Some worshipers seek the aid of hearing radio or television broadcasts for the recitation of the rosary. But the same problem holds true as for CD's and DVD's—that is, should you become distracted, it is difficult to grasp one's place in prayer without a visual reminder of where you are in the rosary recitation.

Praying the rosary with the traditional strand of beads requires the worshiper to hold each rosary bead until the prayer is completed.

Despite the 2002 introduction and propagation of the 4th Great Rosary Mystery (i.e., the Luminous Mysteries), many worshipers are still unaware that this Great Mystery exists.

SUMMARY

These problems and others are addressed by example embodiments of the disclosed rosary prayer stand.

According to an example, non-limiting embodiment, a rosary prayer stand may include a frame. A plurality of parallel rods may be mounted on the frame. A plurality of beads for counting prayers may be slidably mounted on the plurality of rods. One of the rods may support only four beads that respectively represent the Joyful Mysteries, the Luminous Mysteries, the Sorrowful Mysteries, and the Glorious Mysteries. And a different one of the rods may support only five beads that respectively represent five Our Father prayers.

According to another example, non-limiting embodiment, a rosary prayer stand may include a frame. A plurality of parallel rods may be mounted on the frame. One of the rods may slidably support means for respectively representing the Joyful Mysteries, the Luminous Mysteries, the Sorrowful Mysteries, and the Glorious Mysteries. And a different one of the rods may slidably support means for respectively representing five Our Father prayers.

According to another example, non-limiting embodiment, a rosary prayer stand may include a frame. A plurality of parallel rods may be mounted on the frame. A plurality of beads for counting prayers may be slidably mounted on the plurality of rods. The plurality of rods may have axes that intersect a transverse reference plane at locations along an arched path.

The above and other features of the invention including various and novel details of construction and combinations of parts will now be more particularly described with reference to the accompanying drawings. It will be understood that the details of the example embodiments are shown by way of illustration only and not as limitations of the invention. The principles and features of this invention may be employed in varied and numerous embodiments without departing from the scope of the invention.

BRIEF DESCRIPTION OF THE DRAWINGS

Example, non-limiting embodiments will become more fully understood from the detailed description below and the accompanying drawings, wherein like elements are represented by like reference numerals, which are given by way of illustration only and thus are not limiting of the present invention.

DESCRIPTION OF EXAMPLE, NON-LIMITING EMBODIMENTS

A. The Structure:

With reference to the example, non-limiting embodiment depicted in FIGS. 1-8, the rosary prayer stand 102 includes a frame having two opposed side plates 104 that are parallel to each other, and a plurality of support members 106 extending between the side plates 104.

In the illustrated embodiment, three support members 106 are provided: one at the front, lower portion of the frame; one at the rear, upper portion of the frame, and one at the rear, lower portion of the frame. The support member 106 located at the rear, lower portion of the frame is clearly shown in FIGS. 3 and 5. It will be appreciated that more or less than three support members 106 may be suitably implemented. Also, the support members 106 may have a circular cross-sectional shape, or any other geometric cross-sectional shape. The support members 106 may have the same shape or be of different shapes. As shown, the support members 106 are parallel to each other. In alternative embodiments, however, the support members 106 may have different orientations and/or locations. By way of example only, the support members 106 may be fabricated from wood, plastic, metal, or other materials that are well known in this art.

Figure 6:
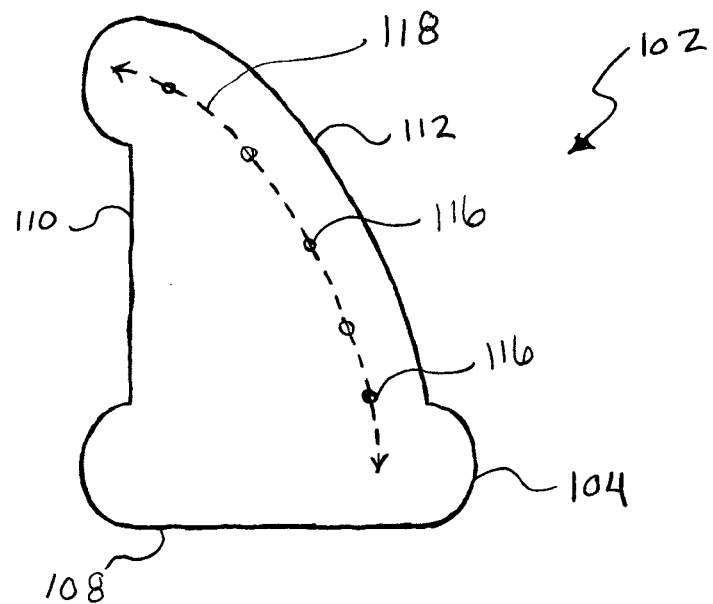
FIG. 6 is a left side elevational view thereof.
Figure 7:
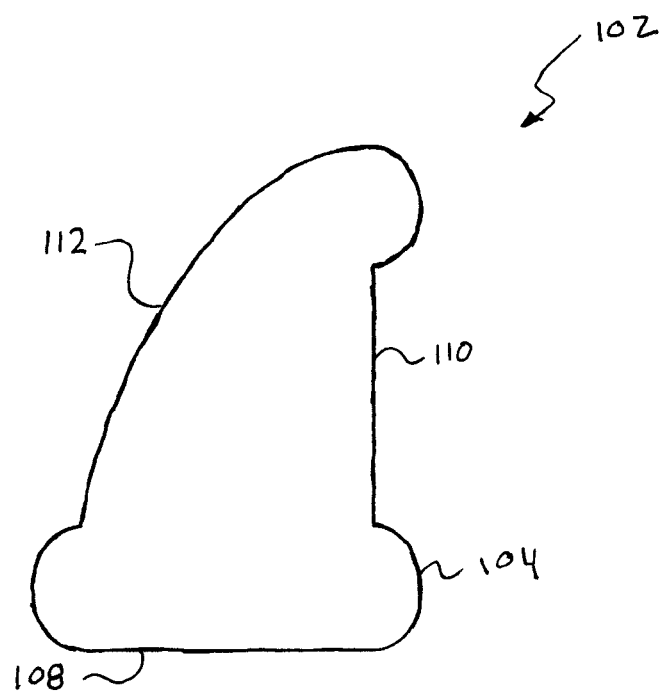
FIG. 7 is a right side elevational view thereof.
Figure 8:
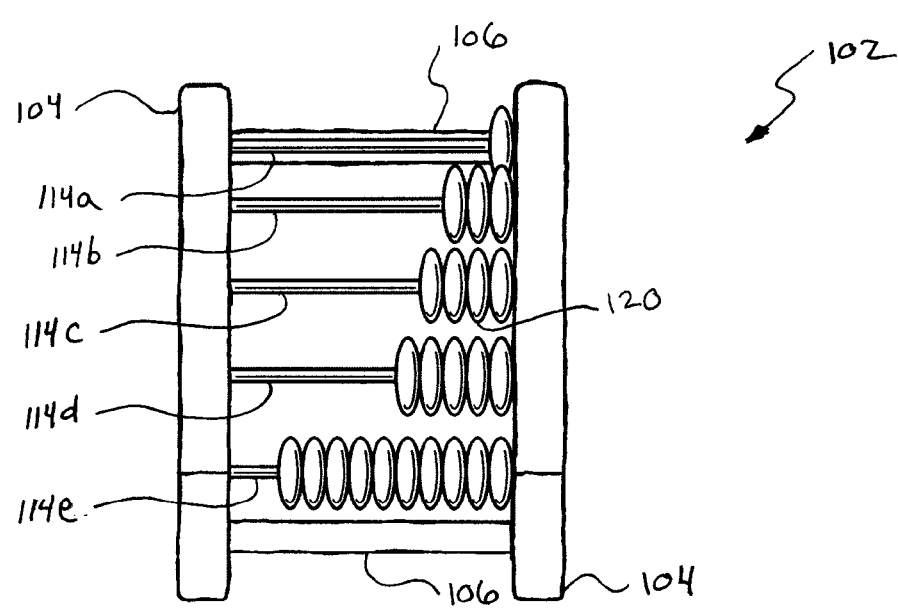
FIG. 8 is a front elevational view with beads pushed to the right thereof.

As shown in FIGS. 6 and 7, the side plates 104 are the same size and shape. Each side plate 104 includes a flat bottom side 108, a flat rear side 110, and a curved front side 112 that extends upward and rearward from the front, lower corner to the rear, upper corner of the side plate 104. In alternative embodiments, the side plates 104 may be of different shapes and sizes. Further, one side plate may have a different shape and size that the other side plate. The side plates 104 may be parallel to each other as shown in FIGS. 1-5 and 8, but the invention is not limited in this regard. The side plates 104 may be adorned with images or words. By way of example only, the side plates 104 may be fabricated from wood, plastic, marble, metal, or other materials that are well known in this art.

Turning back to FIG. 1, five rods 114*a*-114*e* extend between the side plates 104. In the illustrated embodiment, the five rods 114*a*-*e* are parallel to each other, but they do not lie in a common plane. Instead, as schematically shown in FIG. 6, the axes 116 of the rods 114*a*-*e* intersect a transverse reference plane (e.g., the plane of the drawing sheet) at locations along an arched path 118 that extends upward and rearward from the front, lower portion to the rear, upper portion of the frame. The rods 114*a*-*e* may have a circular cross-sectional shape, or any other geometric cross-sectional shape. The rods 114*a*-*e* may have the same shape or be of different shapes. In alternative embodiments, the rods 114*a*-*e* may have different orientations and/or locations. In the illustrated embodiment, the rods 114*a*-*e* have the same length, but the invention is not limited in this regard. By way of example only, the rods 114*a*-*e* may be fabricated from wood, plastic, metal, or other materials that are well known in this art.

Each of the rods 114*a*-*e* slidably supports one or more beads 120, each representing a particular rosary prayer. The placement of the beads 120 and its corresponding prayer for recitation is as follows.

The top rod 114*a* supports one bead 120 representing the Our Father prayer. The next rod 114*b* down supports three beads 120 respectively representing three Hail Mary prayers. The next rod 114*c* down supports four beads 120 respectively representing the Joyful Mysteries, the Luminous Mysteries, the Sorrowful Mysteries, and the Glorious Mysteries, which are collectively known as the Four Great Mysteries. The next rod 114*d* down supports five beads 120 respectively representing five Our Father prayers. The next rod 114*e* down supports ten beads 120 respectively representing ten Hail Mary prayers.

One of the beads 120 representing the Our Father prayer on the rod 114*d* and the ten beads 120 representing the ten Hail Mary's on the rod 114*e* represent a sequence of prayers known as a decade. For example, with reference to FIG. 1, the far right bead 120 on the rod 114*d* and the ten beads 120 on the rod 114*e* represent a first decade. The second bead 120 from far right on the rod 114*d* and the ten beads 120 on the rod 114*e* represent a second decade. The third bead 120 from far right on the rod 114*d* and the ten beads 120 on the rod 114*e* represent a third decade. The fourth bead 120 from far right on the rod 114*d* and the ten beads 120 on the rod 114*e* represent a fourth decade. And the fifth bead 120 from far right on the rod 114*d* and the ten beads 120 on the rod 114*e* represent a fifth decade.

Each of the Four Great Mysteries includes five decades. The five Joyful Mysteries include (1) the first decade—The Annunciation, (2) the second decade—The Visitation, (3) the third decade—The Nativity, (4) the fourth decade—The Presentation, and (5) the fifth decade—The Finding of the Child Jesus in the Temple. The five Luminous Mysteries include (1) the first decade—The Baptism of Our Lord (2) the second decade—The Wedding Feast at Cana, (3) the third decade—The Proclamation of the Kingdom of God, (4) the fourth decade—The Transfiguration of Our Lord, and (5) the fifth decade—The Institution of the Holy Eucharist. The five Sorrowful Mysteries include (1) the first decade—The Agony in the Garden, (2) the second decade—The Scourging at the Pillar, (3) the third decade—The Crowning with Thorns, (4) the fourth decade—The Carrying of the Cross, and (5) the fifth decade—The Crucifixion. And the five Glorious Mysteries include (1) the first decade—The Resurrection, (2) the second decade—The Ascension, (3) the third decade—The Descent of the Holy Spirit, (4) the fourth decade—The Assumption of Mary, (5) the fifth decade—The Crowning of Mary as Queen of Heaven and Earth.

The beads 120 may have the same color, or be of different colors. Different colored beads may be implemented to facilitate progression through the rosary. For example, the Our Father beads 120 on the rods 114*a* and 114*d* may be the same color (e.g., blue). The Hail Mary beads 120 on the rods 114*b* and 114*e* may be the same color (e.g., white). And the Four Great Mysteries beads 120 on the rod 114*c* may be different colors. By way of example only, the Joyful Mysteries bead 120 can be yellow, the Luminous Mysteries bead 120 can be white, the Sorrowful Mysteries bead 120 can be red, and the Glorious Mysteries bead 120 can be green.

Furthermore, other bead indicia (in addition to or instead of color) may be suitably implemented. For example, the beads 120 may be textured or smooth, letters and/or symbols may be provided on the beads, the beads can be of different shapes and sizes, etc. The illustrated beads 120 have oval shaped cross sections, but the invention is not limited in this regard. By way of example only, the beads 120 may be fabricated from wood, glass, plastic, stone, or some other material that is known in this art.

B. The Use:

Each decade of the rosary, like each of the Four Great Mysteries, centers around the life of Jesus. And when people refer to praying the rosary, they usually mean praying just five decades of one Great Mystery while meditating on a particular event in the life of Jesus (or Mary). But there are some worshipers who pray all 20 decades of the rosary each day.

Figure 1:
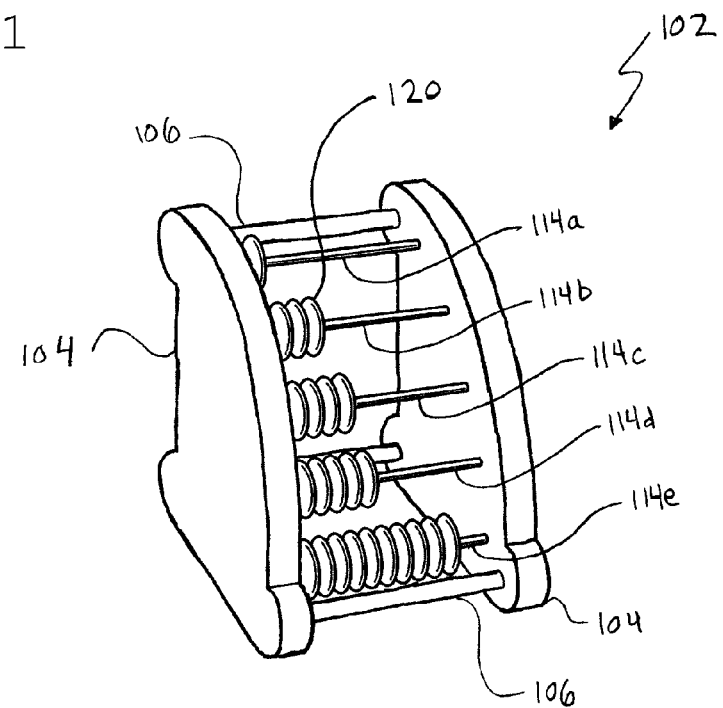
FIG. 1 is a perspective view of a rosary prayer stand according to an example, non-limiting embodiment.
Figure 2:
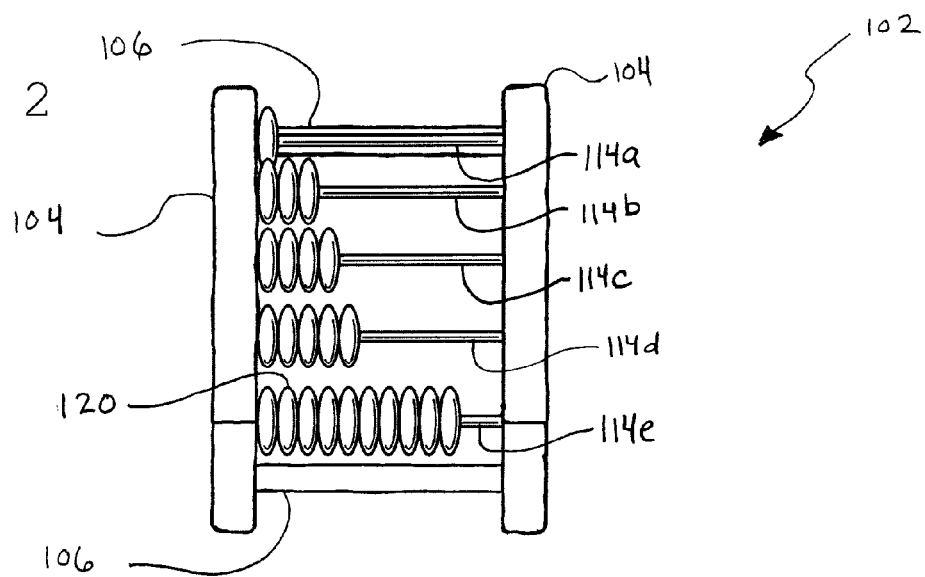
FIG. 2 is a front elevational view thereof.
Figure 3:
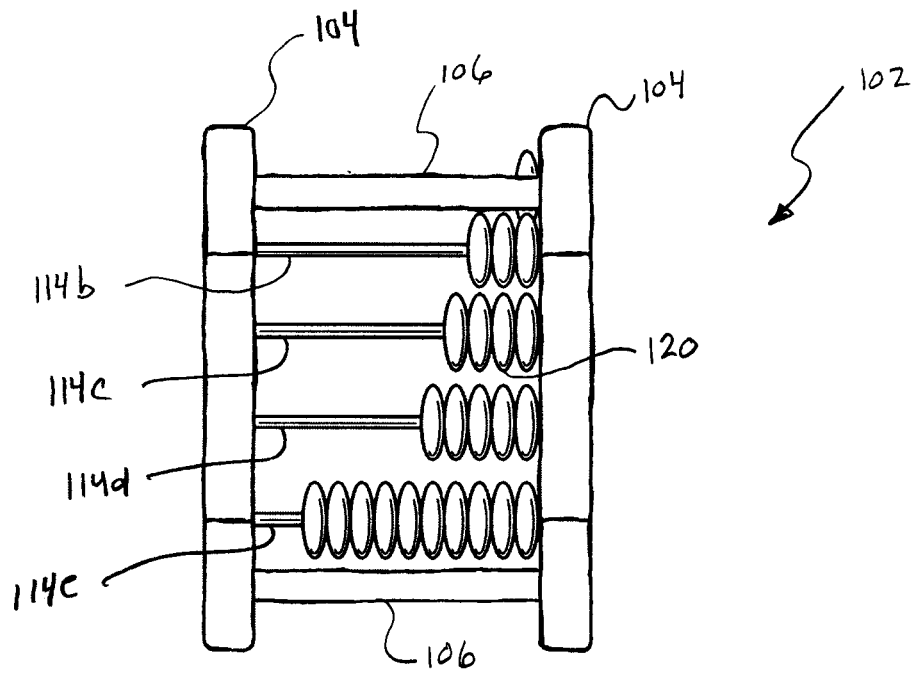
FIG. 3 is a rear elevational view thereof.
Figure 4:
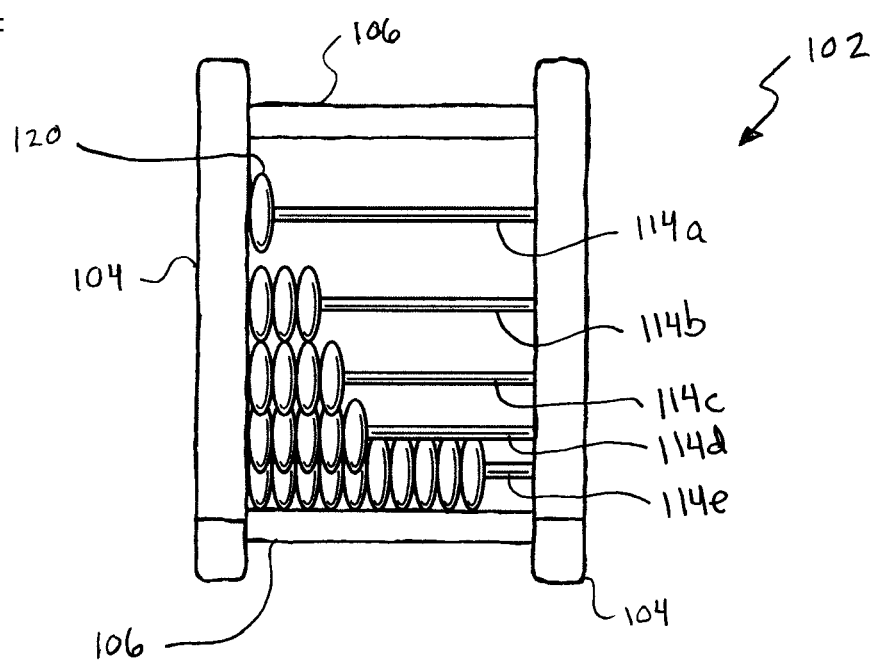
FIG. 4 is a top plan view thereof.
Figure 5:
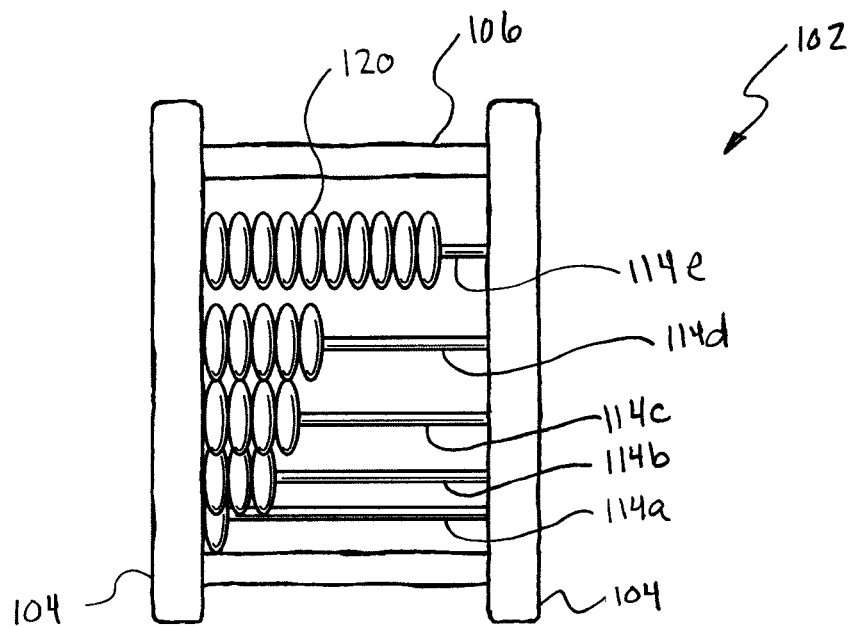
FIG. 5 is a bottom plan view thereof.

The manner for using the rosary prayer stand in reciting the five decades of the Joyful Mysteries follows, and would be repeated in the same manner for the five decades of each the Luminous Mysteries, the Sorrowful Mysteries, and the Glorious Mysteries. The beads 120 are initially positioned on the left side of the stand as shown in FIG. 1, and slid to the right as each rosary prayer is recited. It will be appreciated, however, that the beads 120 may be initially positioned on the right side of the stand as shown in FIG. 9, and slid to the left as each rosary prayer is recited.

Bless oneself with the Sign of the Cross and pray the Apostles' Creed. Go to the top rod 114a, pray the Our Father and while doing so, slide the bead 120 located on the rod 114a to the right.

Go to the second rod 114b, pray three Hail Mary's on the three beads 120, and while doing so slide each bead 120 to the right.

Go to the third rod 114c, select the first (or far right) bead 120 representing the Joyful Mysteries, and slide it to the right.

Go to the fourth rod 114d, pray one Our Father and while doing so slide the first (or far right) bead 120 to the right. Go to the fifth rod 114e, pray a Hail Mary on each of the ten beads 120 and while doing so slide each bead to the right. Pray a Glory Be to the Father after sliding the last Hail Mary bead to the right. The recitation of the first decade of the Joyful Mysteries is complete. Before continuing onto the second decade of the Joyful Mysteries, the beads 120 on the fifth rod 114e should be reset or slid back to the left.

Go back to the fourth rod 114d, pray one Our Father and while doing so slide the second (or second from far right) bead 120 to the right. Go to the fifth rod 114e, pray a Hail Mary on each of the ten beads 120 and while doing so slide each bead to the right. Pray a Glory Be to the Father after sliding the last Hail Mary bead to the right. The recitation of the second decade of the Joyful Mysteries is complete. Before continuing onto the third decade of the Joyful Mysteries, the beads 120 on the fifth rod 114e should be reset or slid back to the left.

Go back to the fourth rod 114d, pray one Our Father and while doing so slide the third (or third from far right) bead 120 to the right. Go to the fifth rod 114e, pray a Hail Mary on each of the ten beads 120 and while doing so slide each bead to the right. Pray a Glory Be to the Father after sliding the last Hail Mary bead to the right. The recitation of the third decade of the Joyful Mysteries is complete. Before continuing onto the fourth decade of the Joyful Mysteries, the beads 120 on the fifth rod 114e should be reset or slid back to the left.

Go back to the fourth rod 114d, pray one Our Father and while doing so slide the fourth (or fourth from far right) bead 120 to the right. Go to the fifth rod 114e, pray a Hail Mary on each of the ten beads 120 and while doing so slide each bead to the right. Pray a Glory Be to the Father after sliding the last Hail Mary bead to the right. The recitation the fourth decade of the Joyful Mysteries is complete. Before continuing onto the fifth decade of the Joyful Mysteries, the beads 120 on the fifth rod 114e should be reset or slid back to the left.

Go back to the fourth rod 114d, pray one Our Father and while doing so slide the fifth and final (or far left) bead 120 to the right. Go to the fifth rod 114e, pray a Hail Mary on each of the ten beads 120 and while doing so slide each bead to the right. Pray a Glory Be to the Father after sliding the last Hail Mary bead to the right. The recitation of the fifth decade of the Joyful Mysteries is complete.

Pray the final prayer, the Hail, Holy Queen. The recitation of the Joyful Mysteries is complete.

Before continuing onto the five decades of the Luminous Mysteries, the beads 120 on the first, second, fourth, and fifth rods 114a, 114b, 114d, and 114e, respectively, should be reset or slid back to the left.

Example embodiments of the rosary prayer stand provide a new mechanism for counting prayers that is intuitive, convenient and simple. For example, when the phone rings or some other interruption occurs, the worshiper may leave the rosary prayer stand as is, knowing that the prayer beads will remain in position. Thus, upon returning to the stand and resuming prayer, the worshiper will know immediately the next recitation in the sequence.

The rosary prayer stand, with its bead placement and optional coloring, is an effective visual instructional tool for teaching the sequence and counting of rosary prayers, most particularly for young children, whose retention is limited. Also, the rosary prayer stand may acquaint an uninformed worshiper of the Great Mystery (i.e., the Luminous Mysteries) because a bead on the stand announces the Luminous Mysteries.

For those with limited time and hesitant to even begin praying the rosary, support is available to them through the use of the rosary prayer stand. For example, instead of looking upon 10 minutes as insufficient prayer time, the worshiper may recognize those 10 minutes as a good beginning for prayer and that some time later the worshiper can return to the rosary prayer stand to complete the sequence of prayers.

The rosary prayer stand may provide comfort and ease of use. It may be easier for worshipers to slid beads across a rod than to manipulate a strand of beads with knotted or crippled fingers and hands. The rosary prayer stand may be helpful to those worshipers who are aged, sick, or handicapped most particularly those suffering from arthritis pain, or those suffering from swelling, numbness, or stiffness in their hands and fingers. They may find the rosary prayer stand a practical way to count prayers by sliding prayer beads easily across a rod from left to right or right to left depending on the preference of the worshipper.

The rosary prayer stand's curved frame makes a convenient resting place for the hand, should the worshiper still desire the peace and serenity of "holding on to the rosary" when praying its prayers.

For those who suffer visual impairment, the rosary prayer stand is easy to use. Here, the worshiper may place an open hand over the frame to determine their place in the prayer sequence.

Worshipers may be intrigued with the novelty of the rosary prayer stand and may be drawn to be more faithful to the recitation of the daily rosary. Some may be more willing to start praying the rosary knowing that the rosary prayer stand makes it easier to pause—perhaps saying a few Hail Mary's—and later return to offer more prayers since the beads were left in a stable position.

The rosary prayer stand may eliminate the need for the worshiper to hold each rosary bead until the prayer is completed. Thus, the worshiper's hands and fingers are free from clutching beads during prayer. This can be advantageous for worshipers who like to multi-task, while still praying. For example, one can shave, or sort papers, or even cook while still making use of the rosary prayer stand as it only takes a brief moment to slide a bead from one side to another in prayer.

For others, the rosary prayer stand may be a reminder, or a visible "Call to Prayer" especially if it is conveniently located and many pass by it. Passersby may offer a prayer, sliding a bead to one side. This would be especially desirable for families as a means to pray the rosary "together" or for those in religious life living in houses of prayer.

Worshipers may like the convenience of placing the rosary prayer stand on any flat surface at home, school, or at work such as a kitchen counter top, a bedside table, a work desk, or even in one's lap.

Small prayer groups may find reciting the rosary on the rosary prayer stand very unifying as everyone may use the same set of beads during the prayer recitation.

The rosary prayer stand may be moved from one location to another without disturbing the position of the beads. And when it is necessary to clear or reset the rosary prayer stand to the "start" position it only requires sliding all beads to one side or giving a quick jerk to the side.

Worshipers may appreciate the size and sturdiness of the rosary prayer stand, for it is less likely to be misplaced, lost, or broken as is often the case with traditional rosary beads.

The rosary prayer stand has a simple structure that facilitates manufacture. It can be assembled with glue, screws, by hand, or by machine. And it can be reconfigured by reversing the bead direction from right to left and changing the angles for the stand. It can also be used for other forms of prayer, most particularly those formalized prayers that use ordinary rosary beads for their recitation, such as the Divine Mercy Chaplet.

What is claimed is:

1. A rosary prayer stand comprising:
   a frame;
   a plurality of parallel rods mounted on the frame; and
   a plurality of beads for counting prayers, the plurality of beads slidably mounted on the plurality of rods;
   wherein one of the rods supports only four beads that respectively represent the Joyful Mysteries, the Luminous Mysteries, the Sorrowful Mysteries, and the Glorious Mysteries;
   wherein a different one of the rods supports only five beads that respectively represent five Our Father prayers;
   wherein five parallel rods are mounted on the frame;
   wherein an upper most one of the rods supports only one bead that represents the Our Father prayer;
   wherein a first adjacent one of the rods supports only three beads that respectively represent three Hail Mary prayers;
   wherein a second adjacent one of the rods supports the four beads that respectively represent the Joyful Mysteries, the Luminous Mysteries, the Sorrowful Mysteries, and the Glorious Mysteries;
   wherein a third adjacent one of the rods supports the five beads that respectively represent five Our Father prayers;
   wherein a fourth adjacent one of the rods supports only ten beads that respectively represent ten Hail Mary prayers.

2. The rosary prayer stand according to claim 1, wherein the four beads that respectively represent the Joyful Mysteries, the Luminous Mysteries, the Sorrowful Mysteries, and the Glorious Mysteries are different colors.

3. The rosary prayer stand according to claim 2, wherein the bead representing the Joyful Mysteries is yellow, the bead representing the Luminous Mysteries is white, the bead representing the Sorrowful Mysteries is red, and the bead representing the Glorious Mysteries is green.

4. The rosary prayer stand according to claim 1, wherein all of the beads on the upper most rod and the third adjacent rod are a first color; and
   wherein all of the beads on the first adjacent rod and the fourth adjacent rod are a second color that is different than the first color.

5. The rosary prayer stand according to claim 4, wherein all of the beads on the upper most rod and the third adjacent rod are blue; and
   wherein all of the beads on the first adjacent rod and the fourth adjacent rod are white.

6. The rosary prayer stand according to claim 1, wherein only twenty three beads are provided for counting prayers.

7. The rosary prayer stand according to claim 1, wherein all of the beads have the same shape.

8. The rosary prayer stand according to claim 1, wherein the plurality of rods have axes that intersect a transverse reference plane at locations along an arched path.

* * * * *